United States Patent
Yoon (10) Patent No.: US 12,014,074 B2
(45) Date of Patent: Jun. 18, 2024

(54) SYSTEM AND METHOD FOR STORING DUMP DATA

(71) Applicant: SK hynix Inc., Gyeonggi-do (KR)

(72) Inventor: Ji Ho Yoon, Gyeonggi-do (KR)

(73) Assignee: SK HYNIX INC., Gyeonggi-Do (KR)

( * ) Notice: Subject to any disclaimer, the term of this patent is extended or adjusted under 35 U.S.C. 154(b) by 25 days.

(21) Appl. No.: 17/682,554

(22) Filed: Feb. 28, 2022

(65) Prior Publication Data

US 2023/0074108 A1   Mar. 9, 2023

(30) Foreign Application Priority Data

Sep. 3, 2021 (KR) .................. 10-2021-0117656

(51) Int. Cl.
*G06F 3/06* (2006.01)

(52) U.S. Cl.
CPC .......... *G06F 3/0655* (2013.01); *G06F 3/0604* (2013.01); *G06F 3/065* (2013.01); *G06F 3/0679* (2013.01)

(58) Field of Classification Search
CPC ...... G06F 3/0655; G06F 3/0604; G06F 3/065; G06F 3/0679; G06F 3/0619
USPC ........................................................ 711/154
See application file for complete search history.

(56) References Cited

U.S. PATENT DOCUMENTS

| | | | | |
|---|---|---|---|---|
| 11,226,755 | B1* | 1/2022 | Douglass | G06F 3/0659 |
| 2005/0228960 | A1* | 10/2005 | Francis | G06F 11/1471 |
| | | | | 714/E11.13 |
| 2005/0240806 | A1* | 10/2005 | Bruckert | G06F 11/165 |
| | | | | 714/6.11 |
| 2016/0321130 | A1* | 11/2016 | Takamiya | G06F 11/073 |
| 2019/0004895 | A1* | 1/2019 | Lee | G06F 11/1048 |
| 2019/0114218 | A1* | 4/2019 | Yun | G06F 11/0784 |
| 2022/0405163 | A1* | 12/2022 | Patel | G06F 9/5005 |

FOREIGN PATENT DOCUMENTS

| | | |
|---|---|---|
| KR | 10-2019-0041331 A | 4/2019 |
| KR | 10-2020-0068332 A | 6/2020 |

* cited by examiner

*Primary Examiner* — Than Nguyen
(74) *Attorney, Agent, or Firm* — IP & T GROUP LLP (57) ABSTRACT

A memory system may include: a memory device including a plurality of dump blocks, and a controller suitable for: generating dump data indicating a state thereof whenever detecting an error, and storing the dump data in a target dump block, wherein the controller may store the dump data by: selecting the target dump block from the plurality of dump blocks, storing first dump data which is generated at a time of initial error detection in a first dump block that is selected as the target dump block, and copying, when newly selecting a second dump block as the target dump block, the first dump data into the second dump block.

20 Claims, 10 Drawing Sheets

FIG. 5C (Target dump block)

SYSTEM AND METHOD FOR STORING DUMP DATA

CROSS-REFERENCE TO RELATED APPLICATION(S)

The present application claims priority under 35 U.S.C. § 119(a) to Korean Patent Application No. 10-2021-0117656, filed on Sep. 3, 2021, the disclosure of which is incorporated herein by reference in its entirety.

BACKGROUND

1. Field

Various embodiments of the present disclosure relate to a memory system and an operating method thereof.

2. Description of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device implemented as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments of the present disclosure are directed to a memory system that may reduce loss of dump data and support effective debugging, and an operating method of the memory system.

In accordance with an embodiment of the present invention, a memory system may include: a memory device including a plurality of dump blocks; and a controller suitable for: generating dump data indicating a state thereof whenever detecting an error, and storing the dump data in a target dump block. The controller may store the dump data by: selecting the target dump block from the plurality of dump blocks, storing first dump data which is generated at a time of initial error detection in a first dump block that is selected as the target dump block, and copying, when newly selecting a second dump block as the target dump block, the first dump data into the second dump block.

In accordance with an embodiment of the present invention, an operating method of a memory system including a plurality of dump blocks, the operating method may include: generating dump data indicating a state of the memory system whenever detecting an error; and storing the dump data in a target dump block. The storing may include: selecting the target dump block from the plurality of dump blocks, storing first dump data which is generated at a time of initial error detection in a first dump block that is selected as the target dump block, and copying, when newly selecting a second dump block as the target dump block, the first dump data into the second dump block.

In accordance with an embodiment of the present invention, an operating method of a controller, the operating method may include: controlling a memory device to: store a first piece of dump data into a first memory block, subsequently store a second piece of dump data into the first memory block, store, when the first memory block has insufficient storage capacity, a third piece of dump data into a second memory block while copying the first piece into the second memory block, and subsequently store a fourth piece of dump data into the second memory block.

DETAILED DESCRIPTION

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to"

perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

Figure 1:
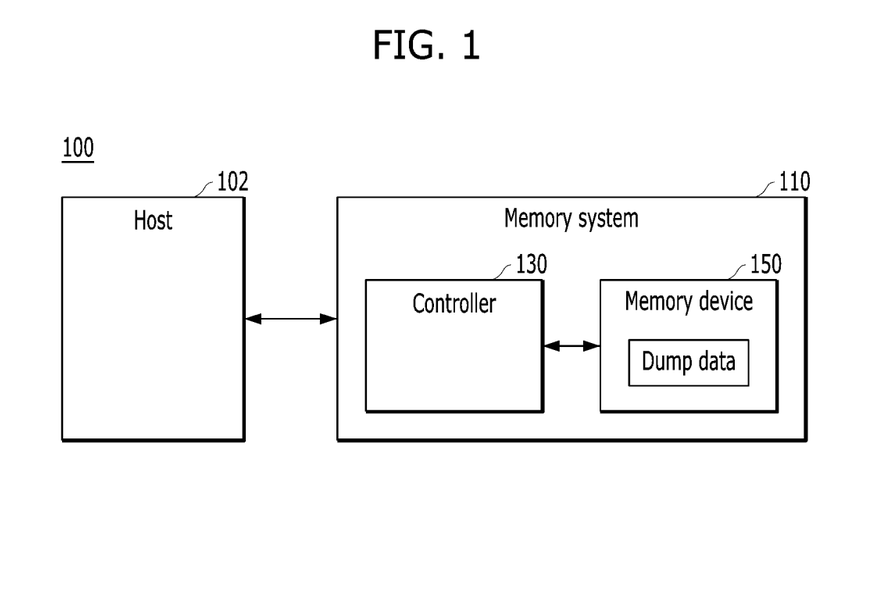
FIG. 1 is a diagram schematically illustrating an example of a data processing system including a memory system, in accordance with an embodiment of the present disclosure.

Referring to FIG. 1, the data processing system 100 may include a host 102 engaged or operably coupled with the memory system 110.

The host 102 may include any of a portable electronic device, such as a mobile phone, an MP3 player, a laptop computer, or the like, and an electronic device, such as a desktop computer, a game player, a television (TV), a projector, or the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control an operation of storing data in the memory device 150.

The controller 130 and the memory device 150 included in the memory system 110 may be integrated into a single semiconductor device, which may be included in any of the various types of memory systems as discussed above in the examples.

By way of example but not limitation, the controller 130 and memory device 150 may be implemented with an SSD. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a secure digital (SD) card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided by the host 102 through a write operation and provide data stored therein to the host 102 through a read operation. The memory device 150 may include a plurality of memory blocks, each of which may include a plurality of pages. Each of the plurality of pages may include a plurality of memory cells to which a corresponding word line of a plurality of word lines (WL) is coupled. In addition, the memory device 150 may be a flash memory, and the flash memory may have a three-dimensional stack structure.

The controller 130 in the memory system 110 may control the memory device 150 in response to a request from the host 102. For example, the controller 130 may provide data read from the memory device 150, to the host 102, and may store data provided from the host 102, in the memory device 150. To this end, the controller 130 may control read, write, program, and erase operations of the memory device 150.

The controller 130 may drive firmware. A source code of the firmware may include an assert code. The assert code may refer to a code for error detection. When it is determined that an error is present in the memory system 110 as a result of executing the assert code, the controller 130 may stop the execution of the assert code, and store dump data in the memory device 150.

The dump data may include information indicating a state of the controller 130 or the host 102 at the time of the detection of the error. For example, the dump data may include data stored in a register of an internal processor of the controller 130, an instruction tightly-coupled memory (ITCM) or a data tightly-coupled memory (DTCM), and data indicating which command is provided from the host 102 to the controller 130.

The host 102 may obtain the dump data stored in the memory device 150 to reproduce the occurrence of an error in the memory system 110, analyze the cause of the error on the basis of the reproduced error, and perform debugging of correcting the source code of the firmware.

The host 102 may reboot the memory system 110 after the error is detected in the memory system 110. Even after the memory system 110 is rebooted, the occurrence of the error in the memory system 110 may be repeated as long as the cause of the error in the memory system 110 is not removed. The controller 130 may generate new dump data whenever the error occurs repeatedly. When an area of the memory device 150 capable of storing dump data has a limited size, the controller 130 may not be able to store all the dump data in the memory device 150. That is, some of the dump data generated by the controller 130 may be lost.

Hereinafter, the memory system 110 and an operating method thereof, which support the host 102 to effectively perform the debugging by reducing loss of dump data, are described with reference to FIGS. 2 to 6.

Figure 2:
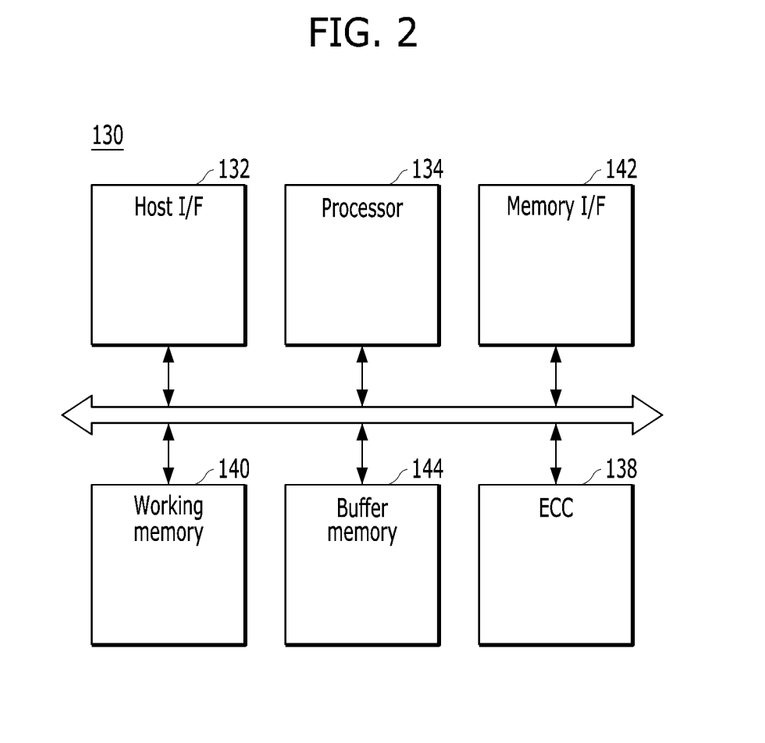
FIG. 2 is a detailed diagram illustrating a controller included in the memory system in accordance with an embodiment of the present disclosure.

FIG. 2 is a detailed diagram illustrating the controller 130 included in the memory system 110 in accordance with an embodiment of the present disclosure.

The controller 130 may include a host interface 132, a processor 134, an error correction code (ECC) 138, a memory interface 142, a working memory 140 and a buffer memory 144, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), and integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. After performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data.

When the number of the error bits is greater than or equal to a threshold number of correctable error bits, the ECC component 138 might not correct error bits but instead may output an error correction fail signal indicating failure in correcting the error bits.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The processor 134 controls the entire operations of the memory system 110. In particular, the processor 134 controls a program operation or a read operation for the memory device 150, in response to a write request or a read request from the host 102. The processor 134 drives firmware which is referred to as a flash translation layer (FTL), to control general operations of the memory system 110. The processor 134 may be realized by a microprocessor or a central processing unit (CPU).

For instance, the controller 130 performs an operation requested from the host 102, in the memory device 150. That is, the controller 130 performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102. For example, the controller 130 may perform a program operation corresponding to a write command, a read operation corresponding to a read command, an erase operation corresponding to an erase command, or a parameter set operation corresponding to a set parameter command or a set feature command as a set command.

The controller 130 may also perform a background operation for the memory device 150, through the processor 134 embodied by a microprocessor or a central processing unit (CPU). The background operation for the memory device 150 may include an operation of copying data stored in a memory block among the memory blocks of the memory device 150 to another memory block, for example, a garbage collection (GC) operation. The background operation may include an operation of swapping data between one or more of the memory blocks of the memory device 150, for example, a wear leveling (WL) operation and a read reclaim (RR) operation. The background operation may include an operation of storing map data retrieved from the controller 130 in the memory blocks of the memory device 150, for example, a map flush operation. The background operation may include a bad block management operation for the memory device 150, which may include checking for and processing a bad block among the plurality of memory blocks in the memory device 150.

The working memory 140 may store data for driving the memory system 110 and the controller 130. For example, the working memory 140 may store source code of firmware such as HIL, FTL and FIL.

The buffer memory 144 may temporarily store data to be stored in the memory device 150, and temporarily store data read from the memory device 150. For example, the buffer memory 144 may temporarily store dump data to be stored in the memory device 150. When an error is detected in the memory system 110, the processor 134 may generate dump data by using data stored in an internal register, ITCM or DTCM, and store the generated dump data in the buffer memory 144. The data stored in the buffer memory 144 may be finally stored in the memory device 150.

The buffer memory 144 may be implemented as a volatile memory. For example, the buffer memory 144 may be implemented as a static random access memory (SRAM) or a dynamic random access memory (DRAM). The buffer memory 144 may be disposed within or out of the controller 130. FIG. 1 illustrates the buffer memory 144 disposed within the controller 130. In another embodiment, the buffer memory 144 may be implemented as an external volatile memory device, and have a memory interface for inputting/outputting data to/from the controller 130.

Figure 3:
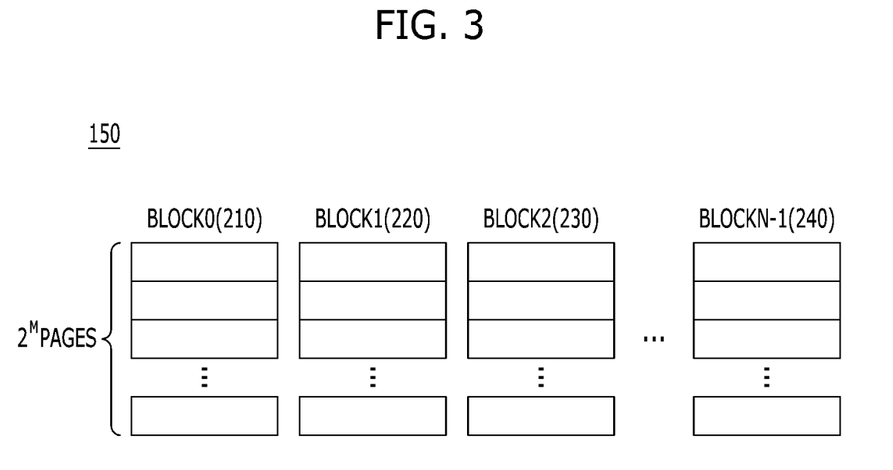
FIG. 3 is a diagram schematically illustrating a memory device in accordance with an embodiment of the present disclosure.

FIG. 3 is a diagram schematically illustrating the memory device 150 in accordance with an embodiment of the present disclosure.

Referring to FIG. 3, the memory device 150 may include a plurality of memory blocks such as a zeroth block BLOCK0 (210), a first block BLOCK1 (220), a second block BLOCK2 (230) and an (N−1)th block BLOCKN−1 (240). Each of the plurality of memory blocks may include a plurality of pages, for example, $2^M$ pages, and the number of pages may vary according to a circuit implementation. Each of the plurality of pages may include a plurality of memory cells coupled to a plurality of word lines.

Each of the memory blocks included in the memory device 150 may be a single level cell (SLC) memory block, a multi-level cell (MLC) memory block, a triple level cell (TLC) memory block, a quadruple level cell (QLC) memory block or a multiple level cell memory block capable of storing data having five or more bits in one memory cell, depending on the number of bits which can be stored in one memory cell.

According to an embodiment, the memory device 150 is described as a nonvolatile memory such as a flash memory, for example, a NAND flash memory. However, the memory device 150 may be implemented as any of memories such as a phase change random access memory (PCRAM), a resistive random access memory (RRAM or ReRAM), a ferroelectric random access memory (FRAM) and a spin transfer torque magnetic random access memory (SU-RAM or STT-M RAM).

The memory device 150 may include a dump block, which is a memory block for storing dump data. Most of the memory blocks included in the memory device 150 may be used to store user data and metadata associated with the user data. Accordingly, the number of dump blocks for storing dump data may be limited. For example, the number of dump blocks may be determined at the time of manufacturing the memory system 110, and only two memory blocks, i.e., the first block BLOCK1 (220) and the second block BLOCK2 (230) among the plurality of memory blocks may be determined as the dump blocks.

Whenever an error occurs repeatedly in the memory system 110, the controller 130 may generate new dump data. If the controller 130 has to erase one dump block in which existing dump data is stored and store new dump data in the erased block whenever the controller 130 stores the new dump data, the existing dump data may be lost. For example, when the memory device 150 includes only two dump blocks, the other dump data may be lost except for dump data associated with two error occurrences. The more dump data is lost, the more difficult it may be for the host 102 to effectively perform debugging.

According to an embodiment, the controller 130 does not erase a dump block in which existing dump data is stored so as to store new dump data but may maintain the existing dump data within the dump block and store the new dump data in an erased area within the dump block.

Hereinafter, a method in which the memory system 110 stores dump data is described in detail with reference to FIGS. 4 to 6.

When an error is detected in the memory system 110, the processor 134 may generate dump data. The dump data may have a predetermined format and a predetermined size. The dump data having the predetermined size may be referred to as a dump unit.

After the error is detected in the memory system 110, the error may occur repeatedly due to the same cause in the memory system 110 as long as the cause of the error is not removed. When the error occurs repeatedly due to the same cause, a plurality of dump units may be generated due to the same cause. Hereinafter, a dump unit generated when an error is first detected is referred to as a "first dump unit", and dump units subsequently generated due to the same cause after the first dump unit is generated are referred to as "subsequent dump units".

The host 102 may perform debugging using the first dump unit and subsequent dump units. Compared to the subsequent dump units, the first dump unit may provide a strong clue for the debugging of the host 102. This is because the subsequent dump units may be highly likely to reflect a state of the controller 130 after a subsequent operation that has little relevance to the cause of the error is performed, whereas the first dump unit may reflect a state of the controller 130 immediately after the occurrence of the error.

Hereinafter, proposed is a method in which the first dump unit can be maintained without being lost even when all the dump units cannot be stored in the memory device 150 because of a limitation of the number of dump blocks of the memory device 150.

Figure 4:
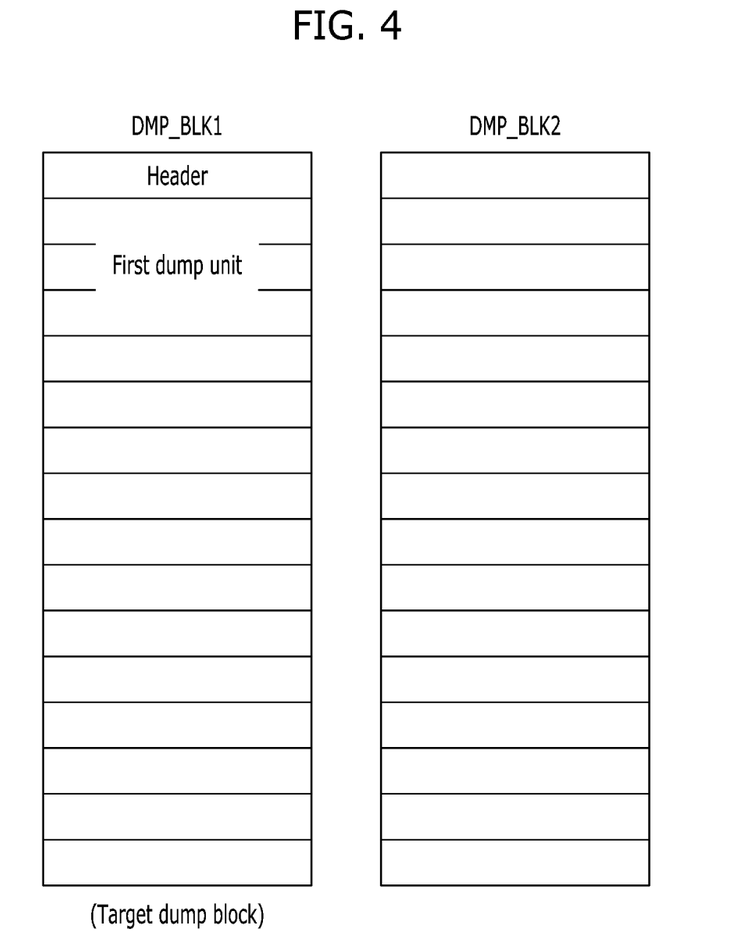
FIG. 4 is a diagram illustrating a method in which the memory system stores a first dump unit in accordance with an embodiment of the present disclosure.

FIG. 4 is a diagram illustrating a method in which the memory system 110 stores a first dump unit in accordance with an embodiment of the present disclosure.

FIG. 4 illustrates a first dump block DMP_BLK1 and a second dump block DMP_BLK2, which are dump blocks included in the memory device 150. Hereinafter, a method in which the memory system 110 stores dump units is described by taking a case where the memory device 150 includes two dump blocks as an example.

The processor 134 may detect an error in the memory system 110, and generate a first dump unit. For example, the processor 134 may determine whether an error occurs, according to an execution result of assert code, and generate a dump unit having a predetermined size on the basis of data obtained from a register, ITCM and DTCM.

The processor 134 may select a target dump block in which the first dump unit is to be stored. For example, all dump blocks of the memory device 150 may be in an erase state before the first dump unit is stored. In an example of FIG. 4, the processor 134 may select, as the target dump block, the first dump block DMP_BLK1 from among the dump blocks in the erase state in order to store the first dump unit.

The processor 134 may store a header including current time information in the selected dump block. The time information may help the processor 134 determine which dump blocks store the most recent dump units when dump units are stored in a plurality of dump blocks.

The processor 134 may store the first dump unit in the selected dump block subsequent to the header of the selected dump block. For example, when the size of the dump unit is equal to the size of three pages, the first dump unit may be stored in a second page through a fourth page of the first dump block DMP_BLK1.

After the processor 134 stores the first dump unit in the first dump block DMP_BLK1, the memory system 110 may be rebooted in response to the control of the host 102. After the memory system 110 is rebooted, an error may occur again with the same cause as the existing cause of error occurrence. The processor 134 may generate a subsequent dump unit, and store the subsequent dump unit subsequent to the first dump unit of the first dump block DMP_BLK1.

FIGS. 5A to 5E are diagrams illustrating, according to the lapse of time, a method in which the memory system 110 stores subsequent dump units in accordance with an embodiment of the present disclosure.

Figure 5A:
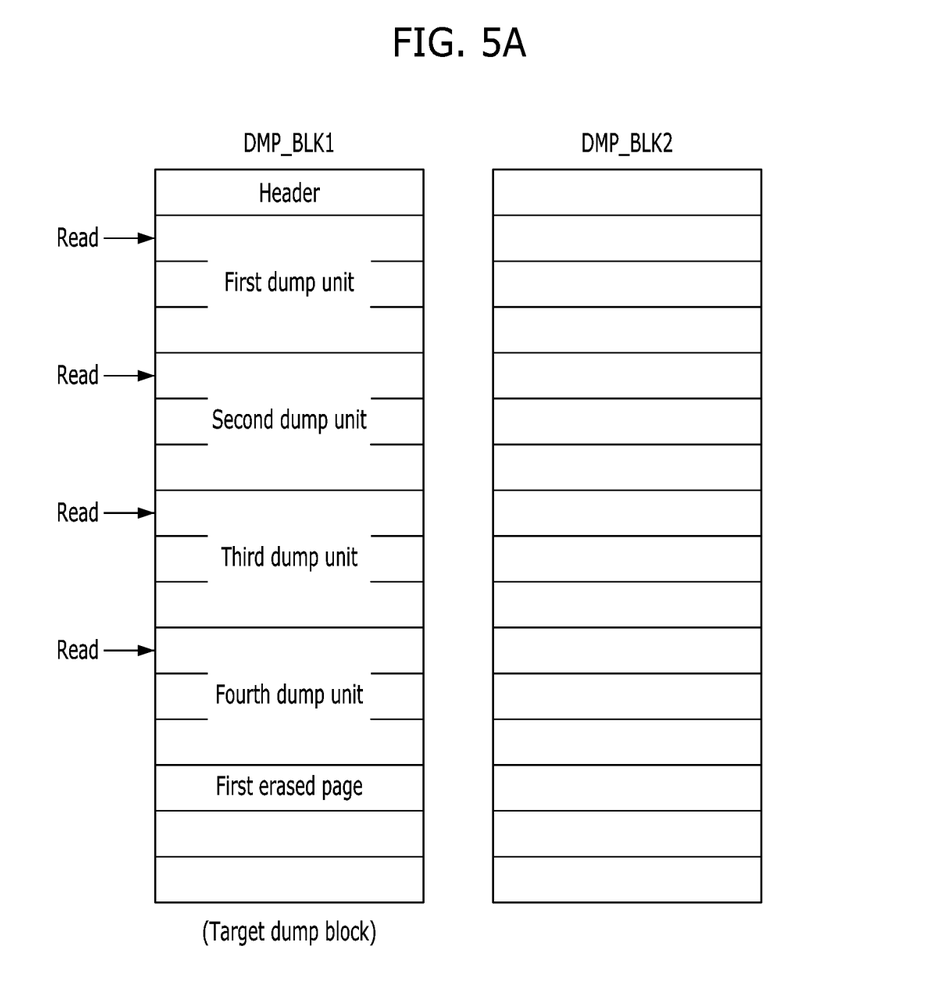
FIGS. 5A to 5E are diagrams illustrating, according to the lapse of time, a method in which the memory system stores subsequent dump units in accordance with an embodiment of the present disclosure.

FIG. 5A illustrates a case in which a first dump unit and second to fourth dump units are stored in the first dump block DMP_BLK1, and then a fifth dump unit is stored in the first dump block DMP_BLK1.

The processor 134 may determine a target dump block for storing the fifth dump unit. The processor 134 may determine, as the target dump block, a dump block in which the last dump unit is stored. In order to determine the target dump block, the processor 134 may read predetermined areas of all dump blocks included in the memory device 150.

The dump blocks of the memory device 150 may be determined in advance. In an example of FIG. 5A, when the processor 134 reads first pages of the first dump block DMP_BLK1 and the second dump block DMP_BLK2, which are the dump blocks of the memory device 150, a header including time information may be read from the first dump block DMP_BLK1, and the second dump block DMP_BLK2 may be read as being in an erase state. The processor 134 may determine the first dump block DMP_BLK1 as the target dump block according to a result of reading the dump blocks.

The processor 134 may store subsequent dump units in a first erased page of the target dump block. The first erased page may refer to a page next to a page in which the dump unit is last stored in the target dump block. The processor 134 may sequentially read predetermined pages within the target dump block to determine the first erased page, and determine whether the pages, which are sequentially read, are erase pages.

For example, the processor 134 may sequentially read pages in which the beginnings of the dump units can be stored from the target dump block. The dump units may have the same size. Accordingly, the pages in which the beginnings of the dump units can be stored in the dump block may be determined in advance based on the sizes of the dump units. In FIG. 5A, the predetermined pages that are sequentially read are indicated by arrows.

Referring to FIG. 5A, when each of the dump units has a size of three pages, the processor 134 may sequentially read a second page, a fifth page, an eighth page, an 11th page and a 14th page, in which the respective beginnings of the dump units can be stored. In the example of FIG. 5A, the second, fifth, eighth and 11th pages in which dump data are stored may be determined as programmed pages, and the 14th page may be determined as an erased page. The processor 134 may determine the 14th page as the first erased page. The processor 134 may store the fifth dump unit, which is the subsequent dump unit, in the first erased page.

When dump units are sequentially stored in a target dump block, storage space remaining in the target dump block may be insufficient to store a dump unit having a predetermined size. When the storage space of the target dump block is insufficient, the processor 134 may store a subsequent dump unit in another dump block in an erase state. In the example of FIG. 5A, when the fifth dump unit is stored in the first dump block DMP_BLK1, the first dump block DMP_BLK1 may be full. When a subsequent dump unit subsequent to the fifth dump unit is generated, the processor 134 may store the subsequent dump unit in the second dump block DMP_BLK2, which is an erased block. When the second dump block DMP_BLK2 is also full, the processor 134 may erase one of the dump blocks, and store the subsequent dump unit in the erased dump block. A method of maintaining the first dump unit in the target dump block so that the first dump unit is not lost even though the processor 134 erases the dump block is described below.

Figure 5B:
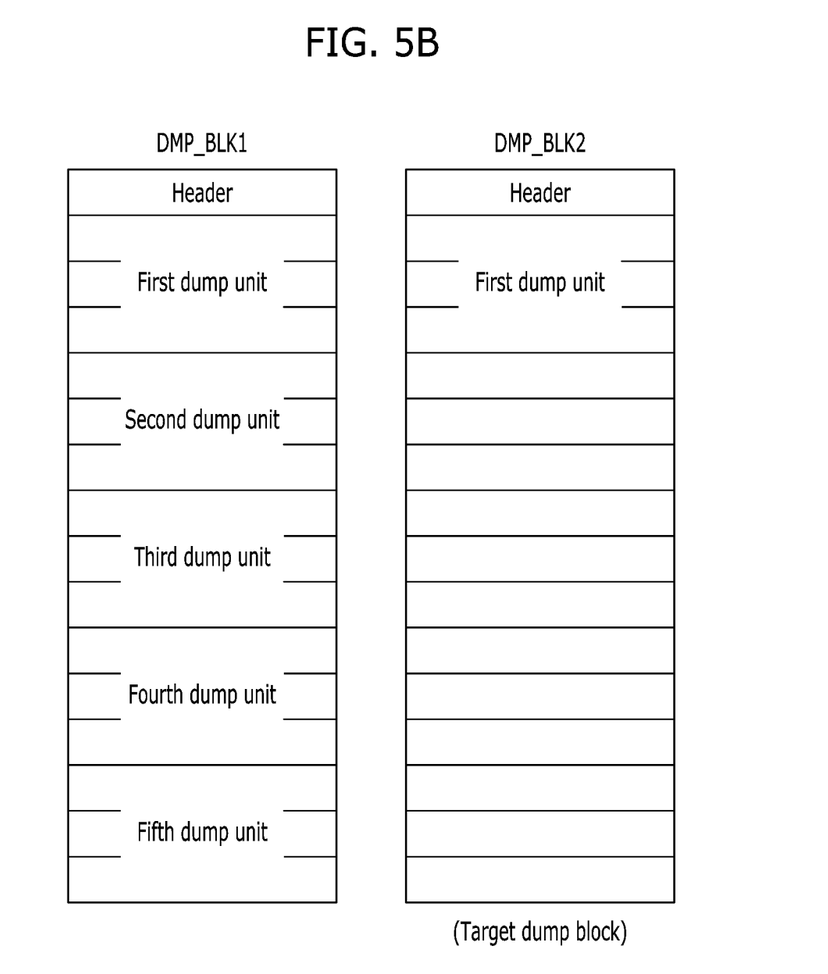

Referring to FIG. 5B, when the first dump block DMP_BLK1 is full, the processor 134 may copy the first dump unit to the second dump block DMP_BLK2, which is the erased block. The processor 134 may store a header indicating time information in the second dump block DMP_ BLK2. The processor 134 may copy the first dump unit from the first dump block DMP_BLK1, and store the copied first dump unit subsequent to the header of the second dump block DMP_BLK2.

Figure 5C:
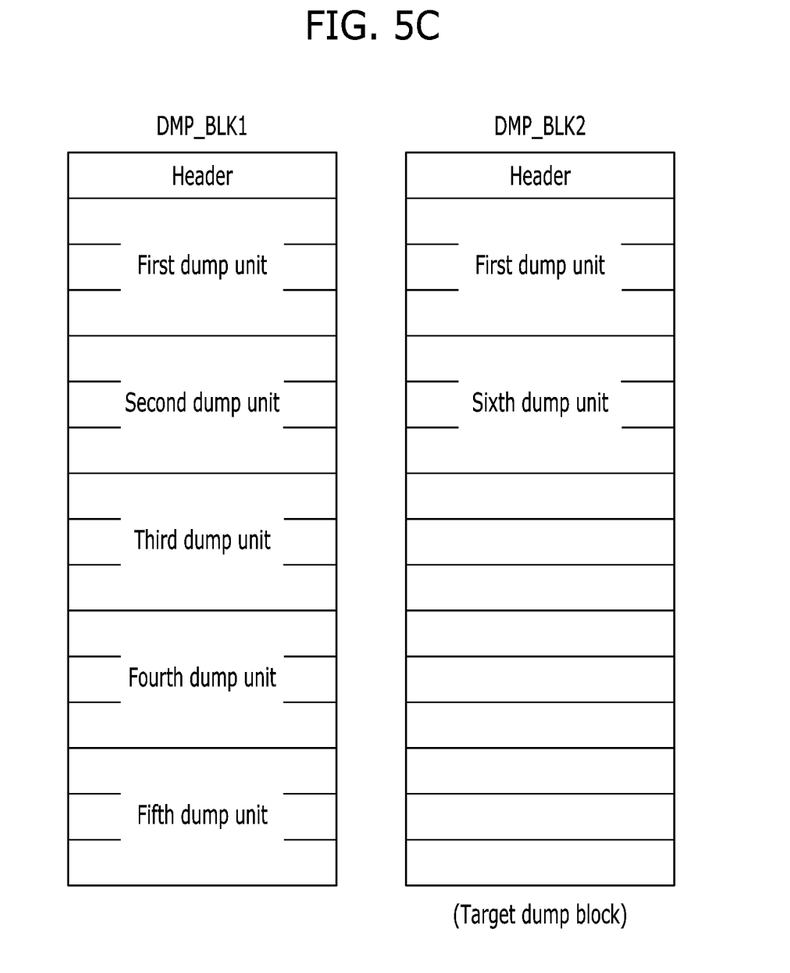

FIG. 5C illustrates a case in which the processor 134 stores a sixth dump unit, which is a subsequent dump unit, in the first dump block DMP_BLK1 or the second dump block DMP_BLK2.

When the processor 134 generates the sixth dump unit, the processor 134 may store the sixth dump unit in a target dump block. The processor 134 may determine, as the target dump block, a dump block in which the dump unit is last stored, by comparing time information included in headers of the first dump block DMP_BLK1 and the second dump block DMP_BLK2. The processor 134 may determine, as the target dump block, the second dump block DMP_BLK2, which is the dump block in which the first dump unit is copied and the last dump unit is stored, and sequentially read predetermined pages from the second dump block DMP_BLK2. The processor 134 may determine a fifth page as a first erased page according to a result of the sequential read, and store the sixth dump unit in the first erased page.

Figure 5D:
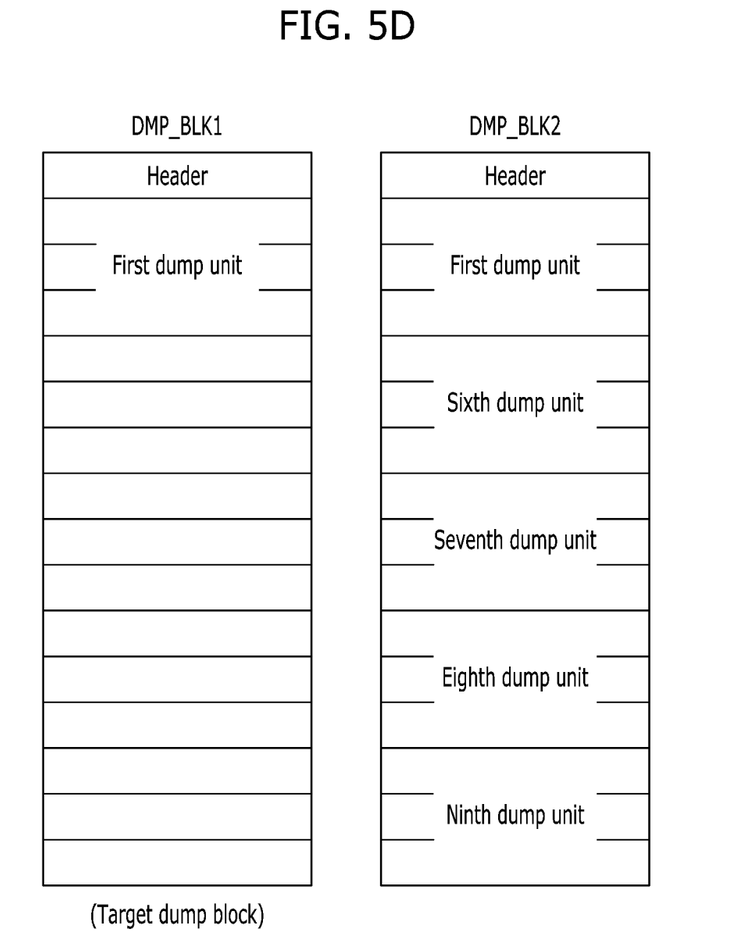

FIG. 5D illustrates a case in which after the first dump block DMP_BLK1 and the second dump block DMP_BLK2 are full, the processor 134 erases one of the first dump block DMP_BLK1 and the second dump block DMP_BLK2 to store a subsequent dump unit.

When a ninth dump unit is stored in the second dump block DMP_BLK2, the first dump block DMP_BLK1 and the second dump block DMP_BLK2 may be full. The processor 134 may erase an old dump block to store a subsequent dump unit. The processor 134 may determine the first dump block DMP_BLK1 as the old dump block by comparing time information included in headers of the first dump block DMP_BLK1 and the second dump block DMP_BLK2. The processor 134 may erase the old dump block. The processor 134 may store a header including new time information in the erased dump block, copy a first dump unit from the second dump block DMP_BLK2, and store the first dump unit subsequent to the header of the first dump block DMP_BLK1.

Figure 5E:
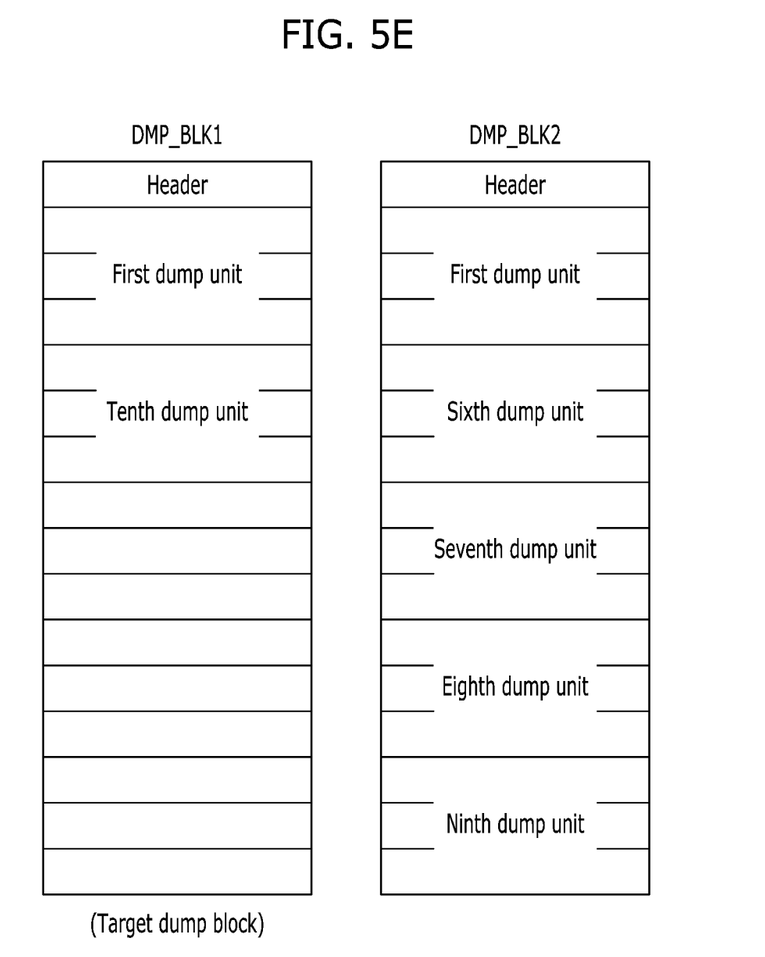

FIG. 5E illustrates a case in which the processor 134 stores a $10^{th}$ dump unit in one of the first dump block DMP_BLK1 and the second dump block DMP_BLK2.

When the processor 134 generates the $10^{th}$ dump unit, the processor 134 may store the tenth dump unit in a target dump block. The processor 134 may determine the first dump block DMP_BLK1 as the target dump block by comparing time information included in headers of the first dump block DMP_BLK1 and the second dump block DMP_BLK2. The processor 134 may determine a fifth page as a first erased page according to a result of sequentially reading predetermined pages of the target dump block, and store the $10^{th}$ dump unit in the first erased page.

According to an embodiment, the processor 134 does not unconditionally erase an existing dump block to store a subsequent dump unit, but may store a subsequent dump unit subsequent to a last-stored dump unit of a target dump block. As the memory cell density of the memory device 150 is improved, an increasing number of dump units may be stored in one memory block.

When the most recent dump block is full, the processor 134 may erase an old dump block, store a first dump unit in the erased dump block, and then store the subsequent dump unit subsequent to the target dump block. According to an embodiment, the processor 134 may maintain the first dump unit, which can provide a strong clue for debugging, in the target dump block at all times.

Figure 6:
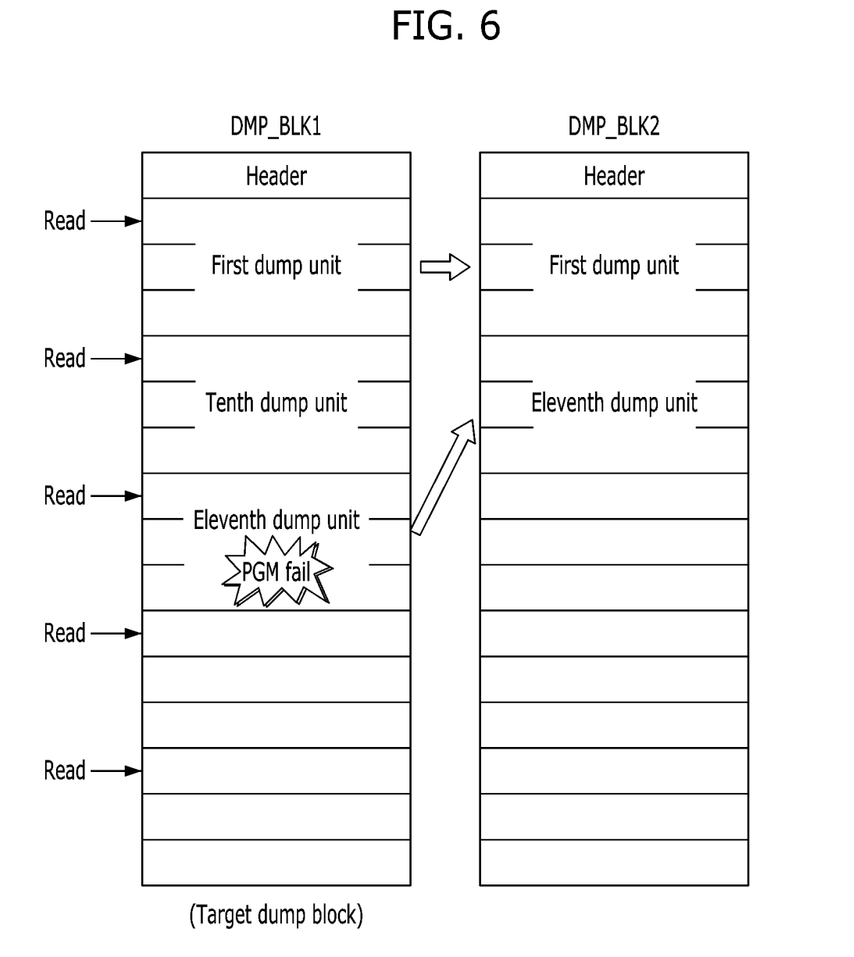
FIG. 6 is a diagram illustrating a method in which a processor handles a program failure that occurs while storing a dump unit in a target dump block in accordance with an embodiment of the present disclosure.

FIG. 6 is a diagram illustrating a method in which the processor 134 handles a program failure that occurs while storing a dump unit in a target dump block in accordance with an embodiment of the present disclosure.

A program failure may occur while the processor 134 programs an $11^{th}$ dump unit in the first dump block DMP_BLK1. When a page in which the program failure occurs is invalidated, and data in which the program failure occurs is programmed again into a next page, a page in which the beginning of the dump unit is stored may be dislocated. For example, when the processor 134 programs one page of the $11^{th}$ dump unit again, the $11^{th}$ dump unit may occupy four pages. When the $11^{th}$ dump unit occupies the four pages, a position at which a dump unit subsequent to the $11^{th}$ dump unit is programmed may be dislocated by one page. Dislocation of the position at which the dump unit is programmed may complicate an operation of finding a first erased page to store a subsequent dump unit.

According to an embodiment, when a program failure occurs while a subsequent dump unit is programmed, the processor 134 may store a header including new time information in an erased dump block, copy a first dump unit stored in an existing target dump block, to the erased dump block, and store the subsequent dump unit subsequent to the first dump unit.

Referring to FIG. 6, when the program (PGM) failure occurs in the first dump block DMP_BLK1 while the $11^{th}$ dump unit is stored therein, the processor 134 may copy the first dump unit to the second dump block DMP_BLK2, and store the $11^{th}$ dump unit again subsequent to the first dump unit.

Figure 7:
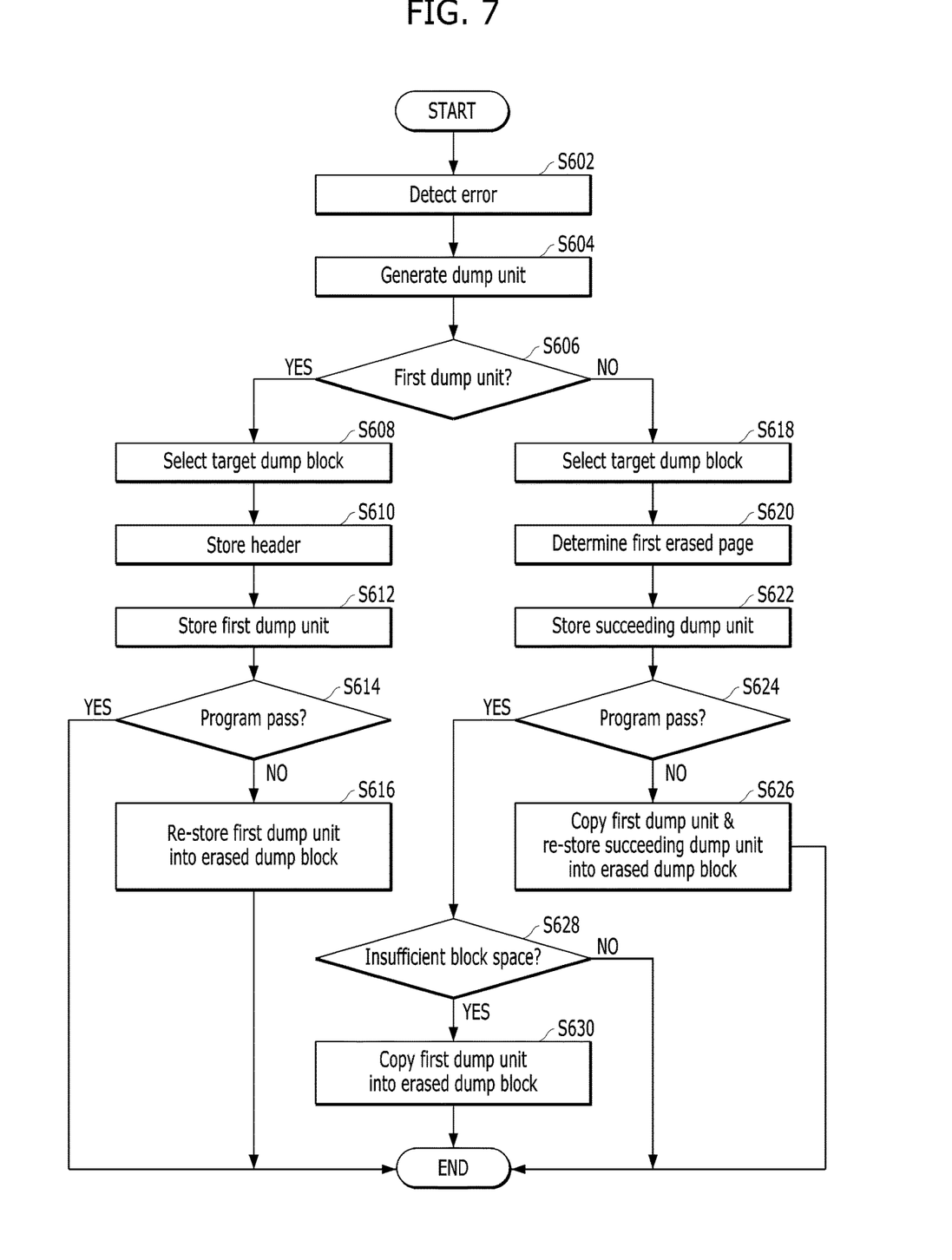
FIG. 7 is a flowchart illustrating an operation of the memory system in accordance with an embodiment of the present disclosure.

FIG. 7 is a flowchart illustrating an operation of the memory system 110 in accordance with an embodiment of the present disclosure.

In operation S602, the processor 134 may detect an error in the memory system 110.

In operation S604, the processor 134 may generate a dump unit indicating a state of the controller 130 or the host 102 at the time of detecting the error.

In operation S606, the processor 134 may determine whether the dump unit is a first dump unit. For example, where there is no dump block in which a header is stored among dump blocks included in the memory device 150, the processor 134 may determine the dump unit as the first dump unit.

When the dump unit is the first dump unit (that is, "YES" in operation S606), the processor 134 may select a target dump block to store the first dump unit from among the dump blocks, in operation S608.

In operation S610, the processor 134 may store a header including time information in the selected dump block. Subsequently, the processor 134 may store the first dump unit in the selected dump block in operation S612. The method of storing the first dump unit in operations S608, S610 and S612 has been described in detail with reference to FIG. 4.

In operation S614, the processor 134 may determine whether a program operation for storing the first dump unit has been passed.

When the program operation has been passed (that is, "YES" in operation S614), the processor 134 may terminate the operation. The memory system 110 may be rebooted in response to the control of the host 102.

When the program operation has failed (that is, "NO" in operation S614), the processor 134 may store the first dump unit again in an erased dump block.

When the dump unit is not the first dump unit but a subsequent dump unit (that is, "NO" in operation S606), the processor 134 may select a target dump block to store the dump unit from among the dump blocks, in operation S618.

In operation S620, the processor 134 may determine a first erased page in the target dump block.

In operation S622, the processor 134 may store the generated dump unit in the selected dump block. The method of storing the subsequent dump unit in operations S618, S620 and S622 has been described in detail with reference to FIGS. 5C and 5E.

In operation S624, the processor 134 may determine whether a program operation for storing the subsequent dump unit has been passed.

When the program operation has failed (that is, "NO" in operation S624), the processor 134 may copy the first dump unit to an erased dump block, store the subsequent dump unit again subsequent to the first dump unit, and terminate the operation, in operation S626.

When the program operation has been passed (that is, "YES" in operation S624), the processor 134 may determine whether storage space remaining in the selected dump block is insufficient to store another dump unit having a predetermined size, in operation S628.

When the remaining storage space is sufficient (that is, "NO" in operation S628), the processor 134 may terminate the operation. The memory system 110 may be rebooted in response to the control of the host 102.

When the remaining storage space is insufficient (that is, "YES" in operation S628), the processor 134 may copy the first dump unit to the erased dump block among the dump blocks in operation S630. For example, when there is an erased block among the dump blocks, the processor 134 may copy the first dump unit to the corresponding block. Alternatively, when there is no erased block among the dump blocks, the processor 134 may erase an old dump block, and copy the first dump unit to the erased dump block. The method of copying the first dump unit in operation S630 has been described in detail with reference to FIGS. 5A, 5B and 5E. When the operation of operation S630 is completely performed, the memory system 110 may be rebooted in response to the control of the host 102.

According to an embodiment, the processor 134 does not use an erased dump block each time to store a subsequent dump unit in the memory device 150, but may store the subsequent dump unit in a dump unit stored in an existing dump block. Further, the processor 134 may maintain a first dump unit in a target dump block even when the number of dump blocks is not sufficient to store all the dump units. Accordingly, the host 102 may obtain the first dump unit and a plurality of latest dump units from the memory device 150, and effectively perform debugging.

An embodiment of the present disclosure may provide a memory system that may reduce loss of dump data and support effective debugging, and an operating method thereof.

Although a memory system and an operating method thereof in accordance with embodiments of the present disclosure have been described as specific embodiments, these are merely examples, and the present disclosure is not limited thereto and should be construed as having the widest range based on the basic idea disclosed in the present specification. Those skilled in the art may carry out unspecified embodiments by combining and replacing the disclosed embodiments, without departing from the scope of the present disclosure. In addition, those skilled in the art may easily change or modify the disclosed embodiments based on the present specification, and it is apparent that such changes or modifications also fall within the scope of the present disclosure and the following claims. Furthermore, the embodiments may be combined to form additional embodiments.

What is claimed is:

1. A memory system comprising:
a memory device including a plurality of dump blocks each storing data in non-volatile state; and
a controller suitable for:
generating dump data indicating a state thereof whenever detecting an error, and
storing the dump data in a target dump block,
wherein the controller stores the dump data by:
selecting the target dump block from the plurality of dump blocks,
storing first dump data which is generated at a time of initial error detection in a first dump block that is selected as the target dump block,
storing subsequent dump data, which is generated at a time of error detection of the same cause of the initial error after the first dump data is generated, in the first dump block, and
copying, when newly selecting a second dump block as the target dump block, only the first dump data excluding the subsequent dump data from the first dump block to the second dump block.

2. The memory system of claim 1,
wherein the second dump block is one of the plurality of dump blocks except for the first dump block, and
wherein the controller newly selects the second dump block when space for storing dump data subsequent to the first dump data is insufficient in the first dump block.

3. The memory system of claim 1,
wherein the second dump block is one of the plurality of dump blocks except for the first dump block, and
wherein the controller newly selects the second dump block as the target dump block when a program operation for storing the dump data, generated subsequent to the first dump data, in the first dump block has failed.

4. The memory system of claim 1, wherein the second dump block is an erased dump block of the plurality of dump blocks.

5. The memory system of claim 1,
wherein the second dump block is a dump block earliest selected as the target dump block among the plurality of dump blocks except for the first dump block, and wherein the controller stores the dump data further by erasing the second dump block before newly selecting the second dump block as the target dump block.

6. The memory system of claim 1, wherein the controller stores the dump data further by storing current time information in a header of the first or second dump block when storing or copying the first dump data to the first or second dump block that is selected as the target dump block.

7. The memory system of claim 6, wherein the controller is further suitable for identifying a current target dump block by the current time information in the headers of the plurality of dump blocks.

8. The memory system of claim 1, wherein the controller is further suitable for identifying an erased area located first among a sequence of areas within the target dump block by sequentially reading the sequence of areas.

9. The memory system of claim 8, wherein a size of each of the sequence of areas depends on a size of the dump data.

10. The memory system of claim 1, wherein the controller detects an error according to an execution result of assert code included in firmware.

11. An operating method of a memory system including a plurality of dump blocks each storing data in a non-volatile state, the operating method comprising:
   generating dump data indicating a state of the memory system whenever detecting an error; and
   storing the dump data in a target dump block,
   wherein the storing includes:
   selecting the target dump block from the plurality of dump blocks,
   storing first dump data which is generated at a time of initial error detection in a first dump block that is selected as the target dump block,
   storing subsequent dump data, which is generated at a time of error detection of the same cause of the initial error after the first dump data is generated, in the first dump block, and
   copying, when newly selecting a second dump block as the target dump block, only the first dump data excluding the subsequent dump data from the first dump block to the second dump block.

12. The operating method of claim 11,
   wherein the second dump block is one of the plurality of dump blocks except for the first dump block, and
   wherein the second dump block is newly selected when space for storing dump data subsequent to the first dump data is insufficient in the first dump block.

13. The operating method of claim 11,
   wherein the second dump block is one of the plurality of dump blocks except for the first dump block, and
   wherein the second dump block is newly selected as the target dump block when a program operation for storing the dump data, generated subsequent to the first dump data, in the first dump block has failed.

14. The operating method of claim 11, wherein the second dump block is an erased dump block of the plurality of dump blocks.

15. The operating method of claim 11,
   wherein the second dump block is a dump block earliest selected as the target dump block among the plurality of dump blocks except for the first dump block, and
   wherein the storing of the dump data further includes erasing the second dump block before newly selecting the second dump block as the target dump block.

16. The operating method of claim 11, wherein the storing of the dump data further includes storing current time information in a header of the first or second dump block when storing or copying the first dump data to the first or second dump block that is selected as the target dump block.

17. The operating method of claim 16, further comprising identifying a current target dump block by the current time information in the headers of the plurality of dump blocks.

18. The operating method of claim 11, further comprising identifying an erased area located first among a sequence of areas within the target dump block by sequentially reading the sequence of areas.

19. The operating method of claim 18, wherein a size of each of the sequence of areas depends on a size of the dump data.

20. The operating method of claim 11, further comprising detecting an error according to a result obtained after assert code included in firmware stored in the memory system is executed in the memory system.

* * * * *